United States Patent

Schumann et al.

[11] Patent Number: 6,090,283
[45] Date of Patent: Jul. 18, 2000

[54] FILTER DRAIN WITH SPRING ENCLOSURE

[75] Inventors: Heiko Schumann, Münster; Gerhard Wiemeyer, Senden, both of Germany

[73] Assignee: Firma Ing. Walter Hengst GmbH & Co. KG, Münster, Germany

[21] Appl. No.: 09/117,989
[22] PCT Filed: Feb. 5, 1997
[86] PCT No.: PCT/DE97/00215
§ 371 Date: Feb. 22, 1999
§ 102(e) Date: Feb. 22, 1999
[87] PCT Pub. No.: WO97/28880
PCT Pub. Date: Aug. 14, 1997

[30]    Foreign Application Priority Data

Feb. 10, 1996 [DE] Germany ............... 296 02 330 U

[51] Int. Cl.⁷ .................................................. B01D 35/16
[52] U.S. Cl. ..................... 210/248; 210/428; 210/435; 210/453; 137/585
[58] Field of Search ................................. 210/248, 313, 210/428, 444, 453, 435; 137/521, 585, 586

[56]    References Cited

U.S. PATENT DOCUMENTS 3,317,046   5/1967   Raupp .
4,354,931  10/1982   Allori et al. .
4,906,365   3/1990   Baumann et al. ............... 210/248

FOREIGN PATENT DOCUMENTS 30 17 003  11/1981   Germany .
33 44 568   6/1985   Germany .
39 33 794   4/1991   Germany .

Primary Examiner—Matthew O. Savage
Attorney, Agent, or Firm—Lahive & Cockfield, LLP

[57]    ABSTRACT

A fluid filter for liquid media with a removable filter insert and a drain opening having a spring-loaded closure element associated therewith. The closure element is held by the filter insert in a closing position that seals the drain opening, and separates from the drain opening when the filter insert is loosened or is removable. The spring is designed as an elongated spring having a U-shaped design.

9 Claims, 2 Drawing Sheets

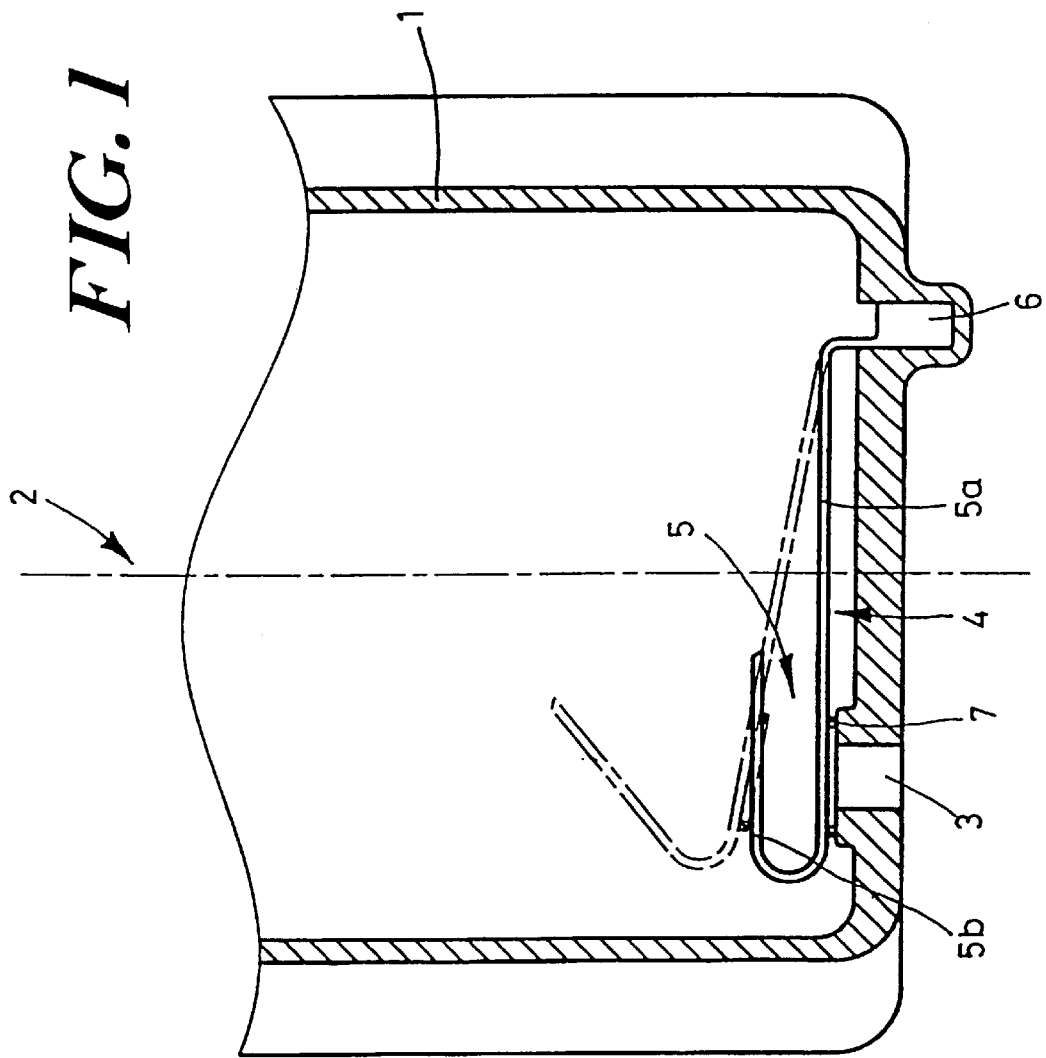

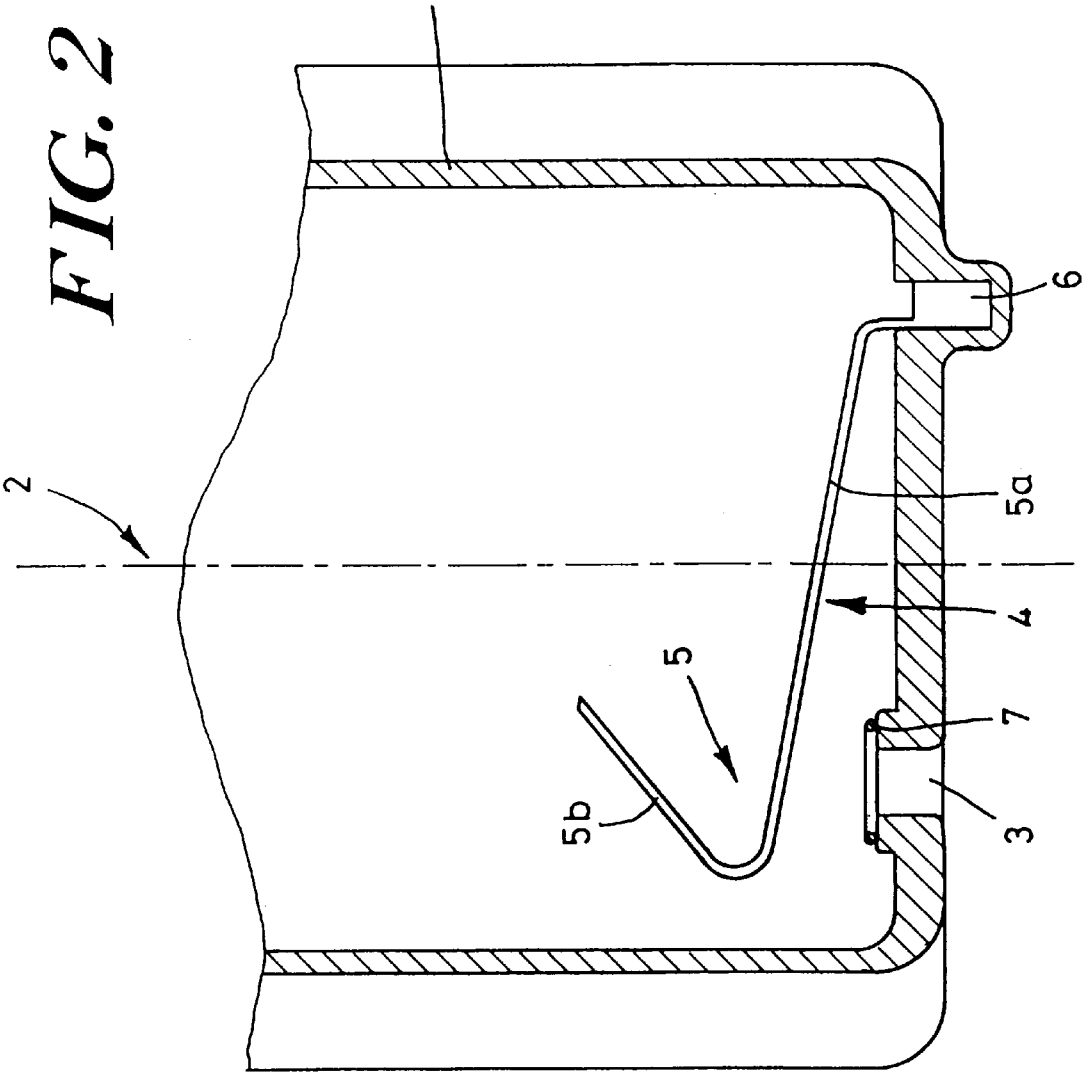
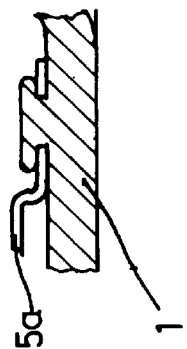

FILTER DRAIN WITH SPRING ENCLOSURE

BACKGROUND OF THE INVENTION

The invention relates to a fluid filter for filtering fluid media, and more particularly to a fluid filter having a spring-loaded closure element for closing a drain opening.

A conventional fluid filter of this kind is shown and described in DE 33 44 568 A1. The closure element is designed as a mushroom-shaped valve. A first elongate spring acts on a valve shaft so that the valve head seals off a drain opening. When the filter insert is changed, the elongate spring releases the valve shaft so that the valve head opens the drain opening. This opening process is favored by a second coil spring which urges the valve head into its open position.

The foregoing valve arrangement is comparatively costly since it requires two springs' and because in addition the coil spring together with the valve head and a shoulder that is circumferential and provided on the valve shaft are located in an additional part, a so-called intermediate housing.

A fluid filter is also shown and described in U.S. Pat. No. 3,317,046 in which a plurality of essentially rectilinear leaf springs are provided as filter bypass valves whose opening and/or closing behavior is determined, as in the case of a check valve, by the flow and pressure conditions.

A diaphragm spring is also shown and described in DE-AS 1 611 121, in which the spring is designed as an annular spring element.

EP 322 828 A1 teaches as a spring element an annular rubber disk as well as a coil or helical spring.

EP 213 889 A2 also shows a drain valve with a coil spring.

The filter inserts can have different dimensions, for example as a result of manufacturing tolerances, but especially also because insert materials are used that change during the operating life of the filter insert. For example, the filter insert can be composed in the form of a plurality of paper or cardboard disks that collapse after being softened by the medium to be filtered, and thus shorten the length of the filter insert.

Especially in the case of such filter inserts with variable dimensions, there is the problem of ensuring reliable sealing of the drain opening during operation and to permit automatic opening of the drain opening provided in the filter housing when changing the filter insert.

One object of the invention is to improve a fluid filter in such fashion that a length adjustment to the changing dimensions of the filter insert over a range that is as wide as possible can be achieved with manufacturing costs that are as low as possible.

This goal which forms the basis of the invention is achieved by the following teachings.

SUMMARY OF THE INVENTION

This object which forms the basis of the invention is achieved by providing a U-shaped rod spring or leaf spring as a spring element that compensates for the changes in the dimensions of the filter insert by virtue of its spring elasticity and thus allows sealing of the drain opening that is always reliable even when the dimensions of the filter insert change. The valve body of the drain valve can be formed very economically by a small plate.

Economically, such a closure element can comprise a leaf spring since the width of the leaf spring can be adapted to the size of the drain opening in such fashion that additional valve plates or the like can be eliminated.

A closure element of this kind can be installed economically and without tools, by securing the spring in a self-locking manner in a matching mount in the filter housing.

The drain opening can be sealed in different ways.

An elastic seal can be provided on the closure element that is either placed completely over the drain opening or surrounds the drain opening like a collar.

As an alternative, a collar-shaped projection can be provided on the closure element that likewise either consists of an elastic material or of a material that is harder than the filter housing, with this sealing collar being formed on the closure element in the shape of a blade that penetrates the material of the filter housing in a sealing fashion.

Another alternative can comprise a sealing collar formed on or fastened to the filter housing. The collar either consists of the filter housing material and has elasticity by virtue of its limited wall thickness, creating a sealing effect in conjunction with the closure element, or this sealing collar, provided in the filter housing itself, can be made of a material that is different from the filter housing material and provides the desired elastic properties for sealing cooperation with the closure element.

Of the alternatives mentioned, those in which the sealing element is provided on the closure element allow replacement of the closure element together with the sealing element, so that simple, rapid, and economical repair is possible if any leaks occur.

Advantageously, the drain opening is provided in the vicinity of the lowest point of the filter in order to permit draining the filter housing as completely as possible. The lowest point in the filter is determined by the shape of the filter housing and by its installation location. The location of the lowest point in the filter is determined by the fact that it is located below the filter insert so when the drain opening is cleared, assurance is provided that the fluid to be filtered can run out completely from the filter insert regardless of any residual amounts remaining in the filter housing.

The drain openings can either be located coaxially with respect to the filter insert, for example in the bottom of the filter housing, or they can be arranged radially, in other words in the wall of the filter housing. With a radial arrangement of this kind, a spring that extends coaxially with respect to the filter insert can advantageously be provided, the spring extending in the unloaded state at a distance from the wall of the filter housing. When the filter insert is inserted, a leaf spring of this kind is pushed outward from the filter insert so that it abuts the drain opening in a sealing fashion. Contact of a leaf spring located in this manner that provides a seal is also ensured when there is a selected change in the length of the filter insert.

With the drain opening located coaxially with respect to the filter insert, in other words in the filter housing bottom for example, it is possible to provide a seal with a leaf spring that is essentially U-shaped, in which one leg seals the drain opening and the other leg can compensate for the change in length of the filter insert by moving like a spring.

DESCRIPTION OF THE DRAWINGS

The preferred embodiments of the invention will now be explained in reference to the drawings wherein:

FIG. 1 is a side cross sectional view of a first embodiment of the invention including a sealing collar attached to the spring member;

FIG. 2 is a side cross sectional view of a second embodiment of the invention including a sealing collar attached to the housing; and FIG. 3 is a third side view of a third embodiment of the invention showing an alternative attachment structure between the spring element and housing.

DESCRIPTION OF THE PREFERRED EMBODIMENT

In the drawing, reference number 1 refers to a filter housing whose lengthwise axis is indicated at 2, with this lengthwise axis 2 also representing the lengthwise axis of the filter insert that can be inserted in filter housing 1. A drain opening 3 is provided in the bottom of filter housing 1, the opening being closed with the aid of a closure element 4. The closure element 4 comprises a leaf spring 5 that is essentially U-shaped with a longer leg 5a and a shorter leg 5b. A foot 6 of leaf spring 5 is formed at the end of longer leg 5a, with filter housing 1 having a recess for self-locking retention of this foot 6.

As shown in FIG.2, a sealing collar 7 can be fastened to the housing.

Longer leg 5a also has an elastic sealing collar 7 that can consist for example of an elastomer ring glued or vulcanized onto leg 5a for contacting a peripheral surface of the housing surrounding the drain opening.

The sealing position of closure element 4 is shown by solid lines. On the other hand, the arrangement represented by the dashed lines represents closure element 4 in its unloaded position, for example after the filter insert has been removed from filter housing 1. The different lengths of the two legs 5a and 5b ensure different spring properties of these two legs 5a and 5b, so that with a reduced length of the filter insert, leg 5b initially moves away from leg 5a while longer leg 5a maintains its sealing position at closure opening 3.

The different spring properties of the two legs of a leaf spring can be influenced in addition to or alternatively to making these two legs of different lengths. This can be accomplished by making the cross-sectional geometry of the spring change to a desired softer or harder spring characteristic as a result of upsetting, constrictions, or the formation of crimps, so that different degrees of spring hardness can be created for adaptation to the structural situation and the existing space relationships, even with a leaf spring with two legs of equal length.

In a modification of the embodiment shown, a spring steel wire can be used instead of the leaf spring. In a design of the spring element of this kind, an additional valve body is required for reliably sealing the drain opening, the body being formed for example by a plate, cone, a segment of a sphere or the like, and possibly made of elastic material. By designing a foot that is comparable with foot 6 shown, such a spring element made of spring steel wire could be mounted so that it will not twist, so that reliable c on tact between the valve body and the drain opening would be ensured.

One advantage of the proposed valve arrangement consists in its "self-helping" function: the greater the pressure differential between the areas separated by the valve, the more firmly the valve will close. This means that even with high internal pressures in the fluid filter, the downward migration of the sealing surface and hence leakage of the closure of the drain opening is avoided. Particularly when using elastomers as sealing elements for the closure, this self-helping effect results in a reliable tightness of the closure under all of the conditions that occur during operation.

In contrast to the possibility of fastening the leaf springs by clamping them in the filter housing, a plurality of fastening possibilities can be provided for such springs. An especially economical alternative to the clamping shown can consist in so-called caulking shown in FIG. 3: the filter housing can have a projecting areas for example in the shape of a small cylindrical stub, with the leaf spring having a matching opening in its foot area. The leaf spring can be secured to the stub and the stub is then compressed like a rivet, with the provision of several such stubs permitting the spring to be secured so that it will not twist. The advantage of such fastening consists in the fact that the machining steps for the leaf spring can be eliminated, which are necessary when leaf springs are secured in their foot areas by clamping.

What is claimed is:

1. Fluid filter for fluid media with a removable filter insert and having a filter housing defining a drain opening, said fluid filter comprising a spring-loaded closure element, said closure element capable of being held by the filter insert by spring action in a closure position that closes the drain opening and which, when the filter insert is loosened or removed, moves clear of the drain opening, said closure element being designed as an elongate spring element being essentially U-shaped with first and second legs, said first leg being located for sealing the drain opening and said second leg being located so as to come in contact with the filter insert thereby applying force to said first leg.

2. Fluid filter according to claim 1, wherein said closure element comprises a leaf spring.

3. Fluid filter according to claim 2, wherein the two legs of said leaf spring have different spring characteristics.

4. Fluid filter according to claim 2, wherein each of said first and second legs of said leaf spring have a cross sectional geometry adapted to produce a selected spring characteristic.

5. Fluid filter according to claim 1, wherein said closure element further comprises a seal made of an elastomer material located so as to contact a peripheral surface of the housing surrounding said drain opening when said closure element is in said closure position.

6. Fluid filter according to claim 1, further comprising an elastic sealing collar disposed around the drain opening, wherein said closure element abuts the collar in a sealing fashion in the closure position.

7. Fluid filter according to claim 1, further comprising a recess formed in the filter housing and a foot portion formed on the spring element, wherein said foot is clamped within said recess.

8. Fluid filter according to claim 7, wherein the housing includes a stub and the foot of the spring element includes a second opening, and wherein said stub has been compressed within said second opening to secure said foot to said housing.

9. Fluid filter according to claim 1, wherein said drain opening extends in a direction parallel to an axis of the filter housing, and said spring element extends essentially radially to said axis.

\* \* \* \* \*